(12) United States Patent
Chatelain et al.

(10) Patent No.: US 9,700,037 B1
(45) Date of Patent: Jul. 11, 2017

(54) DUCK DECOY DEVICE

(71) Applicants: Justin P. Chatelain, Cottonport, LA (US); Kirk Juneau, Plaucheville, LA (US)

(72) Inventors: Justin P. Chatelain, Cottonport, LA (US); Kirk Juneau, Plaucheville, LA (US)

( * ) Notice: Subject to any disclaimer, the term of this patent is extended or adjusted under 35 U.S.C. 154(b) by 0 days.

(21) Appl. No.: 15/096,533

(22) Filed: Apr. 12, 2016

Related U.S. Application Data (63) Continuation-in-part of application No. 14/681,621, filed on Apr. 8, 2015, which is a continuation-in-part of application No. 14/479,614, filed on Sep. 8, 2014, now Pat. No. 9,144,558.

(51) Int. Cl.
*A01M 31/06* (2006.01)

(52) U.S. Cl.
CPC .................. *A01M 31/06* (2013.01)

(58) Field of Classification Search
CPC .............. A01M 31/00; A01M 31/06
USPC ............................................. 43/3
See application file for complete search history.

(56) References Cited

U.S. PATENT DOCUMENTS

| | | | | |
|---|---|---|---|---|
| 2,523,811 A * | 9/1950 | Buehl | ............ | A01M 31/06 43/3 |
| 2,678,778 A * | 5/1954 | Gibson | ............ | A01M 31/06 242/125.2 |
| 2,860,842 A * | 11/1958 | Ryan | ............ | A01M 31/06 242/375.3 |
| 2,917,857 A * | 12/1959 | Muszynski | ............ | A01M 31/06 43/3 |
| 4,056,890 A * | 11/1977 | Dembski | ............ | A01M 31/06 43/3 |
| 4,612,722 A * | 9/1986 | Ferrell | ............ | A01M 31/06 43/26.1 |
| 4,757,630 A * | 7/1988 | Torberg | ............ | A01M 31/06 43/3 |
| 5,367,813 A * | 11/1994 | Cherry | ............ | A01M 31/06 43/2 |
| 6,487,811 B2 * | 12/2002 | Barrett | ............ | A01M 31/06 43/3 |
| 7,117,628 B1 * | 10/2006 | Bailey | ............ | A01M 31/06 242/284 |
| 2003/0173445 A1 * | 9/2003 | Lebens | ............ | B65H 75/406 242/385.4 |

(Continued)

*Primary Examiner* — Marc Burgess
*Assistant Examiner* — Morgan T Barlow
(74) *Attorney, Agent, or Firm* — Stevenson IP, LLC (57) ABSTRACT

A duck decoy device with a hollow duck decoy body joined to a base having a housing thereon, and an insert having selectively separable and pivotable front and rear platforms and selectively separable left and right halves. A spool for holding a line is removably disposed between stilted arches on the left and right halves. A disc, on the spool proximal the right half stilted arch, has notched teeth along an entire outer perimeter thereof. A hook is forwardly disposed on a parallelepiped central shaft on the rear platform and engages one of the notched teeth to arrest spool spinning. A solid metal weight within the entire shell is selectively held and alternately released from the insert, and is fastened to the insert via the line. The insert and the separability of the right and left halves and the front and rear platforms permit servicing and replacement of various parts.

3 Claims, 6 Drawing Sheets

(56) References Cited

U.S. PATENT DOCUMENTS

2008/0155879 A1\* 7/2008 Whipple ............... A01M 31/06
                                                        43/3
2013/0014423 A1\* 1/2013 Tonkovich ............ A01M 31/06
                                                        43/3

\* cited by examiner

DUCK DECOY DEVICE

We claim benefit of our U.S. Nonprovisional Utility application Ser. No. 14/479,614 filed on Sep. 8, 2014 and our U.S. Nonprovisional Utility patent application Ser. No. 14/681,621 filed on Apr. 8, 2015.

BACKGROUND OF THE INVENTION

Various types of duck decoy devices known in the prior art. However, unlike the known duck decoy devices, the present duck decoy device is modular to accommodate repair and replacement of the components, provides a solid metal weight within an entire shell disposed on an underside of the duck decoy body, and provides a sinker fastened to the decoy via a reeled flexible feed line disposed on a spool. The present duck decoy device also provides a disc on one side of the spool which includes a plurality of notched teeth along the entire outer perimeter thereof as well as an upwardly directed hook disposed on a shaft of a rear platform that is engageable to one of the notched teeth to arrest spinning of the spool in order to cease the release of the line from the spool and to maintain the sinker at a selected distance from the underside of the duck decoy.

FIELD OF THE INVENTION

The present device relates to duck hunting accessories and, more particularly, to a duck decoy device.

SUMMARY OF THE INVENTION

The general purpose of the duck decoy device, described subsequently in greater detail, is to provide a duck decoy device that has many novel features that result in a duck decoy device which is not anticipated, rendered obvious, suggested, or even implied by prior art, either alone or in combination thereof.

To accomplish this, the duck decoy device includes a hollow duck decoy body having a head end, a tail end, a top side, and a bottom side. A ring is disposed in the tail end on the top side to tether the duck decoy body to either a decoy line or to a setting member, such as a portion of a blind. An elliptical base is disposed within the bottom side of the duck decoy body. The base has an upper side, a lower side, and a peripheral lip along the upper side. A longitudinal rib and a plurality of lateral ribs disposed on the upper side provide structural integrity to the base. A quonset-shaped housing, disposed on the upper side, has an opening is disposed therethrough proximal the head end. A beveled entry is disposed between the opening, the upper side, and the lower side. A mirror image laterally protruded indent is disposed within each of the first side and the second side. An insert is removably inserted into the base and has a superior side, an inferior side, and separable front and rear platforms. The front platform has selectively separable left and right haves, as well as front and rear sides and a stilted arch on the superior side having a flexible ear disposed therein. A detent, disposed within the respective flexible ear, is selectively fitted into a respective one of the indents of the first side and the second side. The beveled entry aids in insertion of the detents into the housing. A quonset-shaped receiver is disposed longitudinally on the superior side adjacent the rear side of each of the left half and the right half. A slot is disposed in the receiver at the rear side. A depression is disposed within the slot. A plurality of spaced apart spacers is disposed on the front platform inferior side.

A parallelepiped shaft half is extended longitudinally from the superior side of each of the left half and the right half on the rear side. An axle is extended laterally from the right half stilted arch to the left half stilted arch. An orifice, disposed within the left half stilted arch, receives the axle therein. A spool is removably disposed on the axle. The spool is can be self-retracting and, further, ratcheting. A disc is disposed on the spool proximal the stilted arch on the right half. A plurality of spaced apart notched teeth is disposed along the entire outer perimeter of the disc. A flexible line is disposed on the spool. The front platform inferior side has a plurality of spaced apart laterally disposed spacers. An inwardly open cusped half arc is disposed on the front side and extended downwardly therefrom.

The rear platform has a bottom portion, a neck portion affixed to the bottom portion, and a centrally disposed parallelepiped shaft. An upwardly directed hook is forwardly disposed on the parallelepiped shaft. The hook has a proximal portion integrally disposed on the shaft at an angle of approximately 225 degrees relative the shaft and a distal portion disposed at an angle of approximately 235 degrees relative the proximal portion. The hook is engageable with one of the notched teeth to arrest spinning of the spool in order to cease the release of the line from the spool. The hook and notched teeth on the disc increase the durability of the spool. The separation of the left half from the right half releases the spool from the axle.

A pair of spaced apart arms is disposed on the rear platform and extends toward the front platform. A projection, disposed medially on each arm, is removably and pivotally fitted within a respective one of the depressions. A finger pull is disposed on the neck portion inferior side. A cusped half arc is disposed on the front platform front side and extended downwardly there from. A cusped partial arc is disposed on the rear platform rear side and extends downwardly away from the rear platform. An elliptical sinker has a shell and a solid metal weight disposed within the entire shell. The sinker abuts the spacers when confined in place between the cusped half arc and the cusped partial arc. A foramen is disposed in the elliptical sinker proximal to the spool to selectively secure the line to the sinker. After the line passes through the foramen, an object may be tied to the line to prevent retreat through the foramen. The elliptical sinker is configured to be held within the cusped half arc and the cusped partial arc. The elliptical sinker is configured to be released from the cusped partial arc by a pull of the finger pull toward the duck body. The cusped half arc is configured to release the sinker upon a release of the sinker from the cusped partial arc and also by an upward pivot of the rear platform.

Thus has been broadly outlined the more important features of the present duck decoy device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
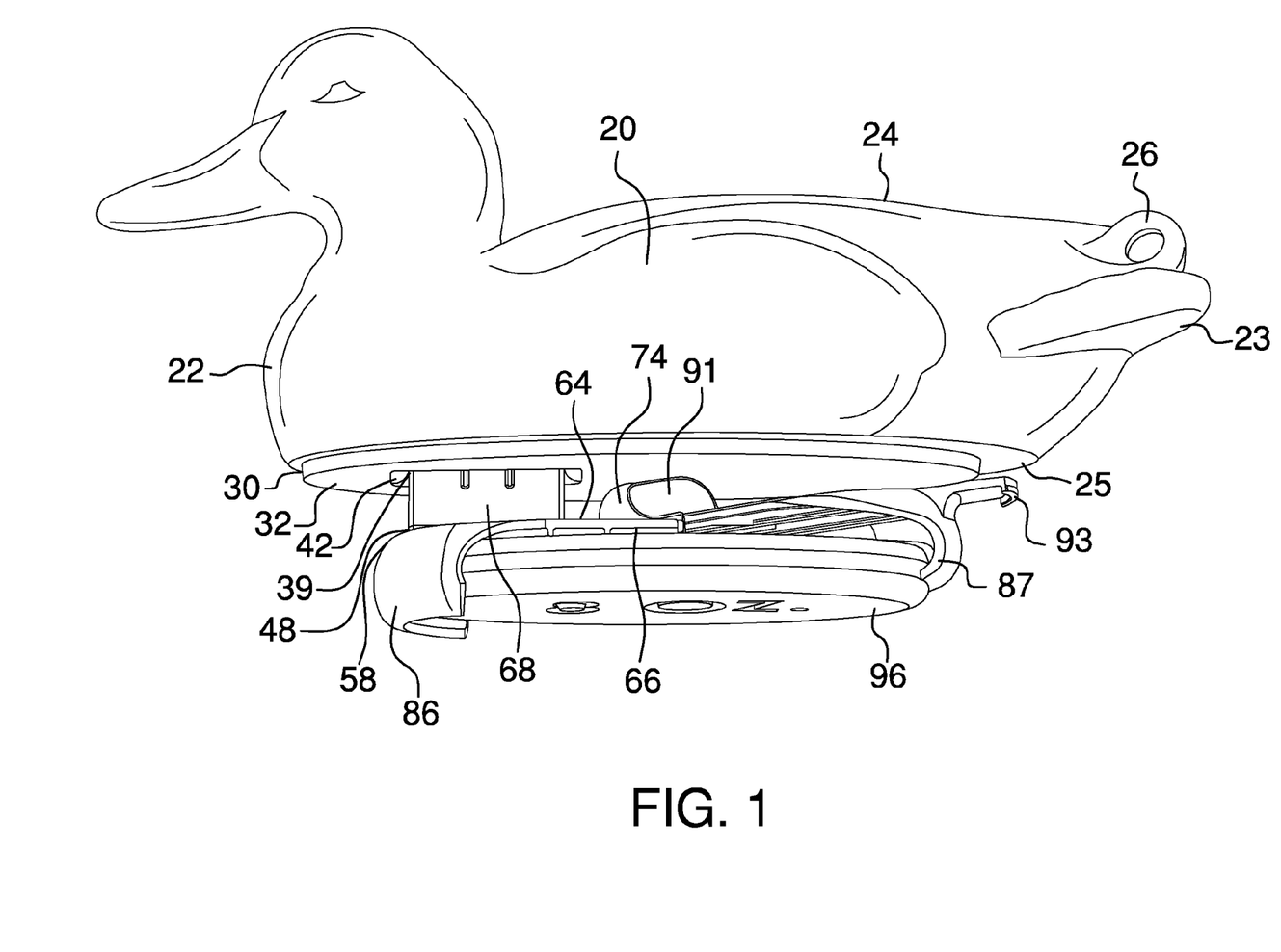
FIG. 1 is a bottom perspective view.
Figure 2:
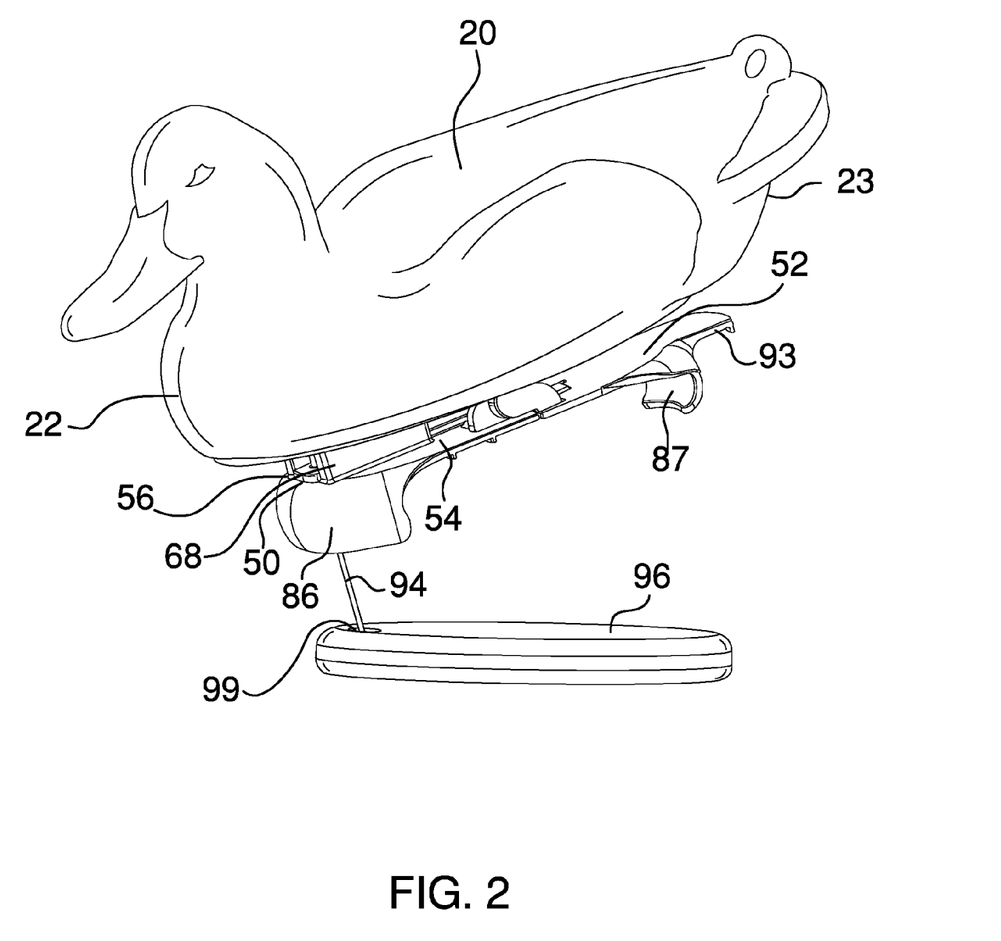
FIG. 2 is a front end perspective view.
Figure 3:
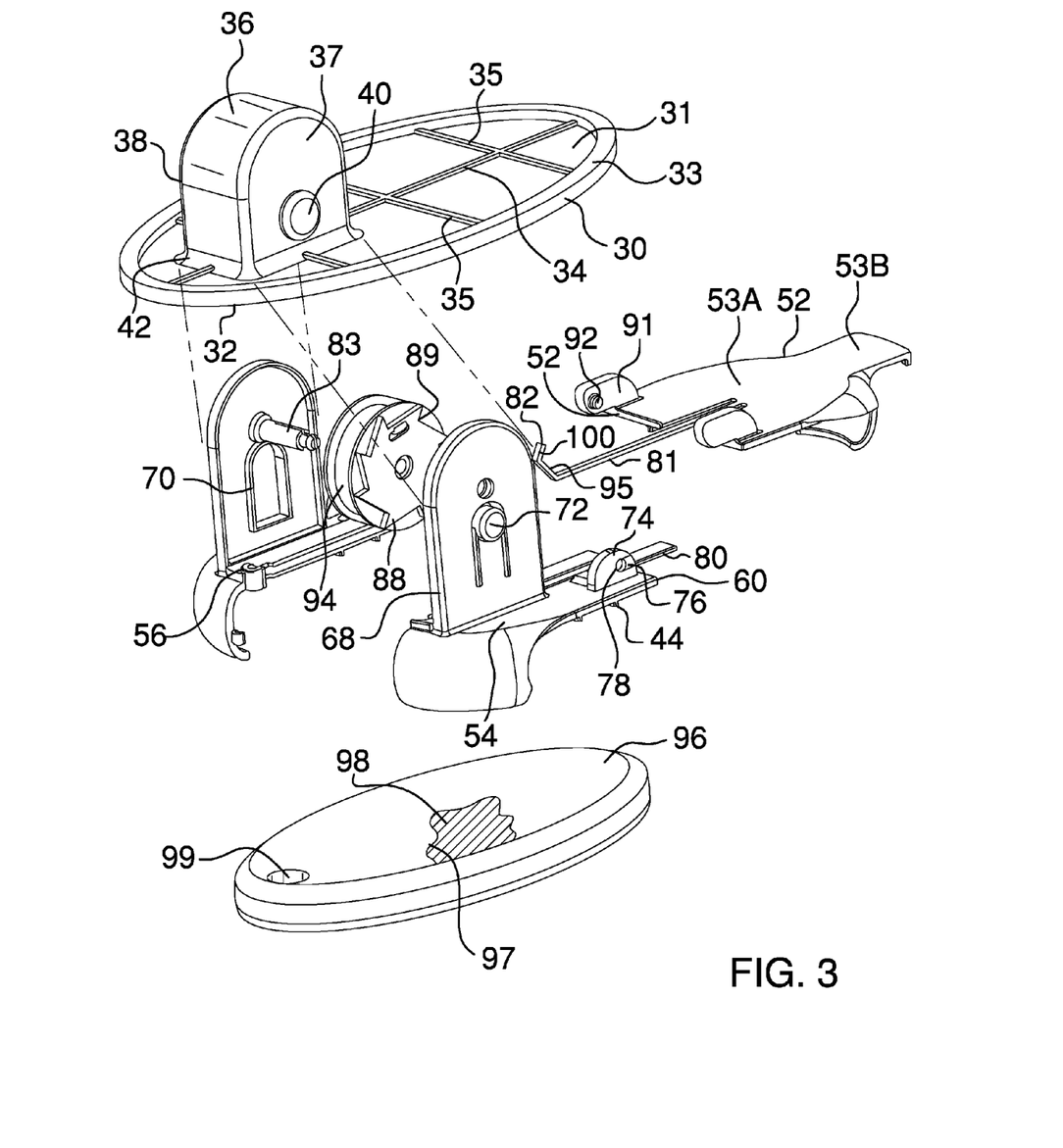
FIG. 3 is an exploded view of the insert.
Figure 4:
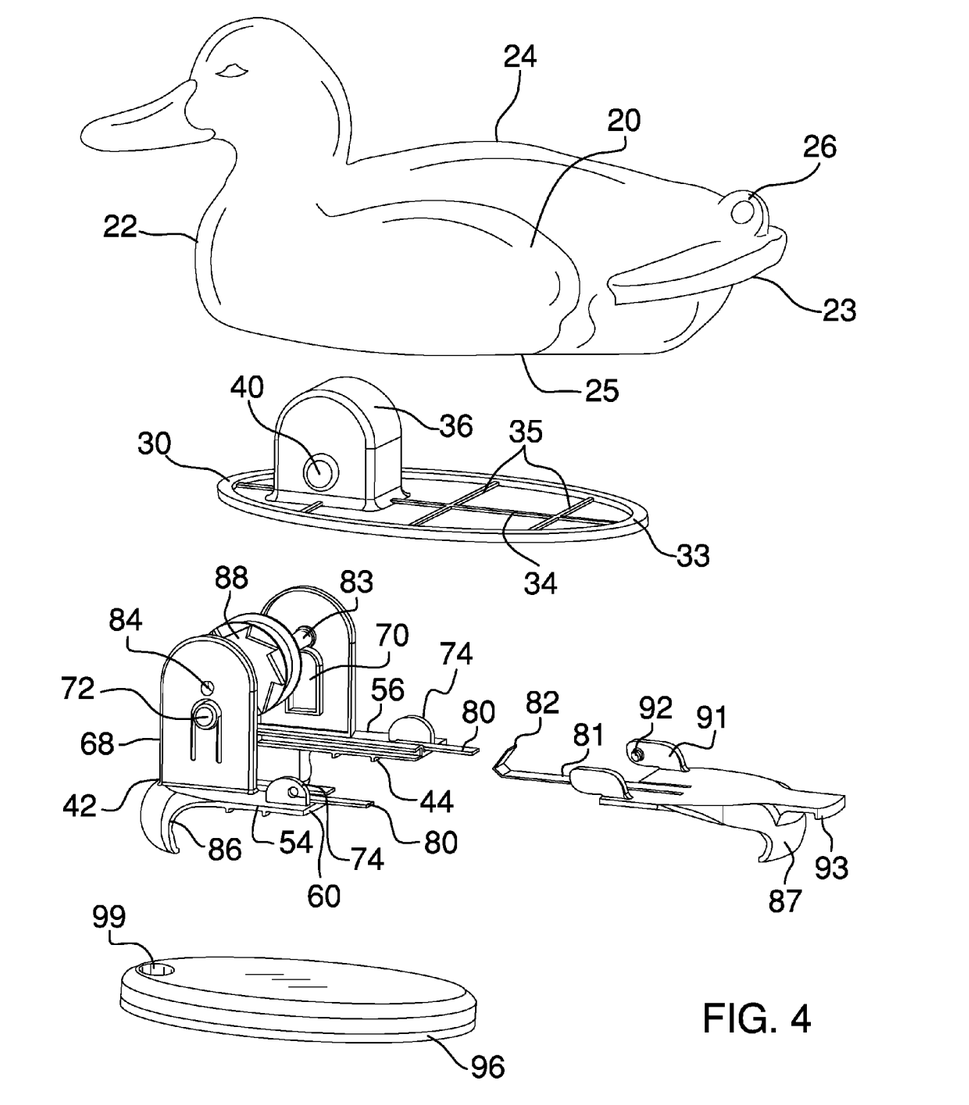
FIG. 4 is an exploded perspective view.
Figure 5:
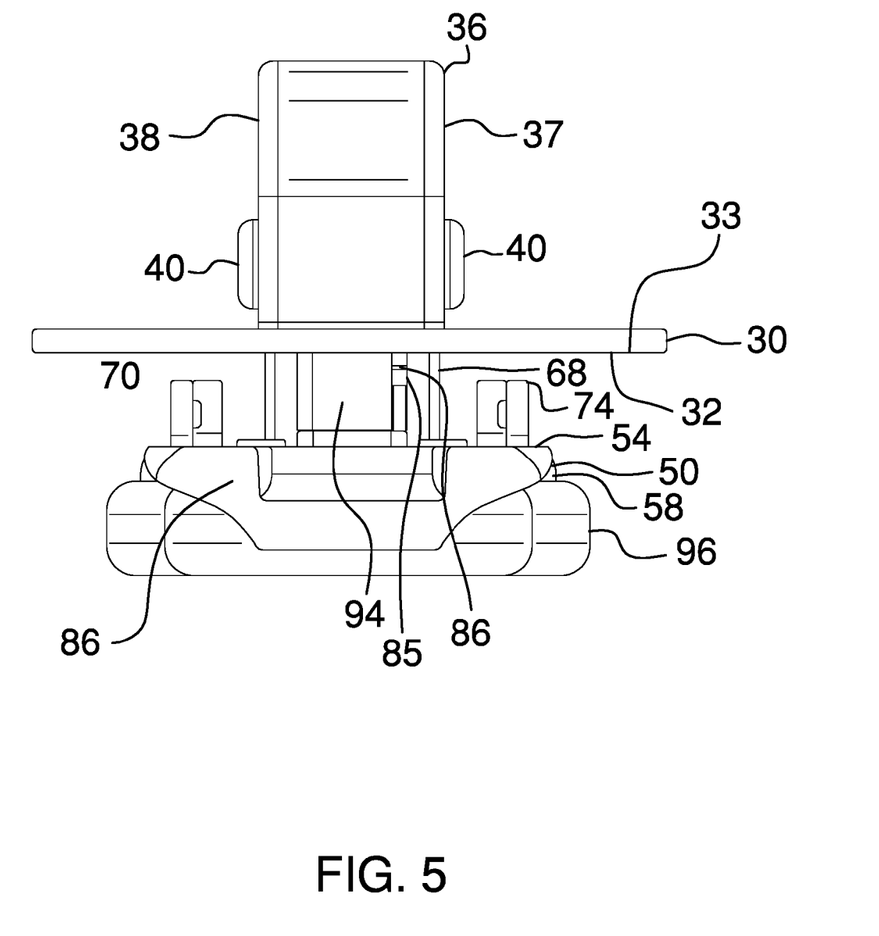
FIG. 5 is a front elevation view in an assembled condition.
Figure 6:
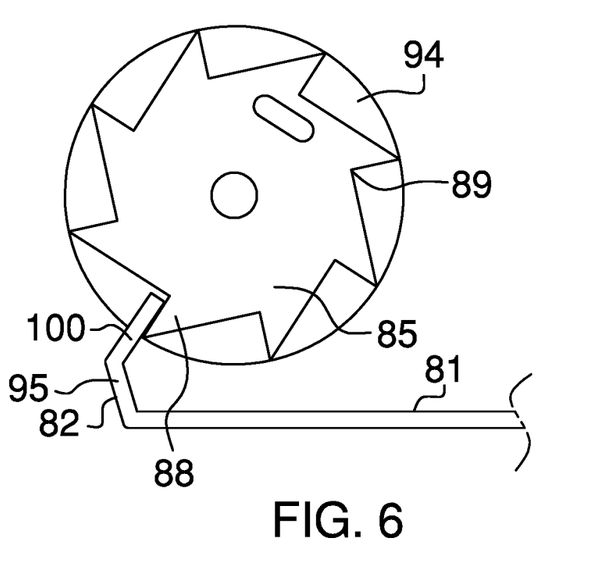
FIG. 6 is a detail view of a spool, a disc disposed thereon, a plurality of notched teeth on the disc, and a hook engaging one of the notched teeth.

With reference now to the drawings, and in particular FIGS. 1 through 6 thereof, an example of the duck decoy device employing the principles and concepts of the present duck decoy device and generally designated by the reference number 10 will be described.

Referring to FIGS. 1 through 5, the duck decoy device partially comprises a hollow body 20. The hollow body 20 has a head end 22 and a tail end 23 spaced apart from the head end 22, and a top side 24 and a bottom side 25 spaced apart from the top side 24. A ring 26 is disposed in the top side 24 of the tail end 23. An elliptical base 30 is affixed within the bottom side 25, wherein the body 20 and the base 30 are watertight. The base 30 has an upper side 31 and a lower side 32 spaced apart from the upper side 31. A peripheral lip 33 is affixed to the upper side 31. A longitudinal rib 34 is disposed centrally on the upper side 31. The longitudinal rib 34 substantially extends from proximal the head end to the tail end. A plurality of spaced apart lateral ribs 35 is disposed on the upper side 31. The lateral ribs 35 intersect the longitudinal rib 34.

A quonset-shaped housing 36 is disposed on the upper side 31. The housing 36 has a first side 37 and a second side 38. An opening 39 is disposed through the upper side 31 and the lower side 32. A beveled entry 42 is disposed between the opening 39, the upper side 31, and the lower side 32. A mirror image laterally protruded indent 40 is disposed within each of the first side 37 and the second side 38.

An insert 48 is removably inserted into the base 30. The insert 48 has a superior side 64 and an inferior side 66. The insert 48 has a front platform 50 removably affixed to a substantially pear-shaped rear platform 52. The front platform 50 has a left half 54, a right half 56 selectively separable form the left half 54, a front side 58, and a rear side 60 spaced apart from the front side 58. The superior side 64 of each of the left half 54 and the right half 56 has a stilted arch 68 with a flexible ear 70 disposed within the stilted arch 68. A detent 72 is disposed within the flexible ear 70. Each detent 72 is selectively fitted into one of the indents 40, respectively. A quonset-shaped receiver 74 is disposed longitudinally on the superior side 64 adjacent the rear side 60 of each of the left half 54 and the right half 56. A slot 76 is laterally disposed in the receiver 74 at the rear side. A depression 78 is disposed within the slot 76. A plurality of spaced apart spacers 44 is disposed on the front platform 50 inferior side 66.

A parallelepiped shaft half 80 is extended longitudinally from the super side 64 of each of the left half 54 and the right half 56 on the rear side 60. An axle 83 is extended laterally from the right half 56 stilted arch 68 to the left half 54 stilted arch 68. An orifice 84 is disposed within the left half 54 stilted arch 68. The orifice 84 removably receives the axle 83. A spool 94 is removably disposed on the axle 83. The spool 94 can be self-retracting and, further, ratcheting. A disc 85 is disposed on the spool 94 proximal the stilted arch 68 on the right half 56. A plurality of spaced apart notched teeth 88 is disposed along the entire outer perimeter 89 of the disc 85. A flexible line 90 is disposed on the spool 94. An inwardly open cusped half arc 86 is disposed on the front side 58 and extended downwardly there from.

The rear platform 52 has a bottom portion 53A and a neck portion 53B affixed to the bottom portion 53A. The rear platform 52 has a centrally disposed parallelepiped shaft 81. An upwardly directed hook 82 is forwardly disposed on the parallelepiped shaft 81. The hook 82 has a proximal portion 95 integrally disposed on the shaft 81 at an angle of approximately 225 degrees relative the shaft 81 and a distal portion 100 disposed at an angle of approximately 235 degrees relative the proximal portion 95. The hook 82 is engageable with one of the notched teeth 88 to arrest spinning of the spool 94 in order to cease the release of the line 90 from the spool 94. The separation of the left half 54 from the right half 56 releases the spool 94 from the axle 83.

A pair of spaced apart arms 91 is disposed on the rear platform 52 and extended toward the front platform 50. A projection 92 is disposed medially on each arm 91 of the pair of arms 91. One of each projection 92 is removably and pivotally fitted within one of the depressions 78, respectively. A finger pull 93 is disposed on the neck portion 53B inferior side 66.

A cusped half arc 86 is disposed on the front platform 50 front side 58 and extended downwardly there from. A cusped partial arc 87 is disposed on the rear platform 52 rear side 60 and extended downwardly away there from. An elliptical sinker 96 has a shell 97 and a solid metal weight 98 disposed within the entire shell 97. A foramen 99 is disposed in the elliptical sinker 96 proximal to the spool 94. The foramen 99 is configured to provide for selectively securing the line 90 from the spool 94 to the sinker 96. The elliptical sinker 96 is configured to be held within the cusped half arc 86 and the cusped partial arc 87. The sinker 96 is configured to be released from the cusped partial arc 87 by a pull of the finger pull 93 toward the duck body 20. The cusped half arc 86 is configured to release the sinker 96 upon a release of the sinker 96 from the cusped partial arc 87. The sinker 96 is also released by an upward pivot of the rear platform 52.

What is claimed is:

1. A duck decoy device comprising:
a hollow duck decoy body, the duck decoy body having a head end, a tail end spaced apart from the head end, a top side, and a bottom side spaced apart from the top side;
a ring disposed in the top side of the tail end;
an elliptical base affixed within the bottom side, the base having an upper side and a lower side spaced apart from the upper side, the base and duck decoy body are watertight;
a peripheral lip continuously disposed along the upper side;
a longitudinal rib centrally disposed on the upper side, the longitudinal rib substantially extending from proximal the head end to the tail end;
a plurality of spaced apart lateral ribs disposed on the upper side, the lateral ribs intersecting the longitudinal rib;
a quonset-shaped housing disposed on the upper side, the housing having a first side spaced apart from a second side, an opening disposed through the upper side and the lower side, a beveled entry disposed between the opening and the lower side;
a mirror image laterally protruded indent disposed within each of the first side and the second side;
an insert removably inserted into the base, the insert having a superior side and an inferior side spaced apart from the superior side; the insert having a front platform and a substantially pear-shaped rear platform removably attached to the left platform, the front platform having:

a left half and a right half selectively separable from the left half, a front side and a rear side spaced apart from the front side, the superior side of each of the left half and the right half having:
   a stilted arch;
   a flexible ear disposed in the stilted arch;
   a detent disposed within the flexible ear, each detent selectively fitted into a respective one of the indents;
   wherein the detents and indents are configured to selectively retain the insert within the base;
   a quonset-shaped receiver disposed longitudinally adjacent the rear side;
   a slot disposed in the receiver at the rear side;
   a depression disposed within the slot;
   a plurality of spaced apart spacers disposed on the front platform inferior side;
   a parallelepiped shaft half extended longitudinally from the superior side of each of the left side and the right side on the rear side;
an axle extended laterally from the right half stilted arch to the left half stilted arch;
an orifice disposed within the left half stilted arch, the orifice removably receiving the axle;
a spool removably disposed on the axle;
a flexible line disposed on the spool;
a disc disposed on the spool proximal the stilted arch on the right half;
a plurality of spaced apart notched teeth disposed along an entire outer perimeter of the disc;
the insert front platform bottom side having an inwardly open cusped half arc disposed on the front side and extended downwardly away from the front platform;
the rear platform having a bottom portion and a neck portion affixed to the bottom portion, the rear platform having:
   a centrally disposed parallelepiped shaft;
   an upwardly directed hook forwardly disposed on the centrally disposed parallelepiped shaft,
      the hook having a proximal portion integrally disposed on the centrally disposed parallelepiped shaft at an angle of approximately 225 degrees relative the shaft and a distal portion disposed at an angle of approximately 235 degrees relative the proximal portion, wherein the hook is engageable to one of the notched teeth, wherein engagement of the hook to one of the notched teeth arrests a spinning movement of the spool;
   wherein the selective separation of the right half from the left half releases the spool from the axle;
   a pair of spaced apart arms extended toward front platform;
   a projection disposed medially on each arm of the pair of arms, one of each projection removably and pivotally fitted within one of the depressions, respectively;
   a finger pull disposed on the neck portion inferior side;
   a cusped half arc disposed on the front platform front side and extended downwardly therefrom;
   a cusped partial arc disposed on the rear platform rear side and extended downwardly therefrom;
   an elliptical sinker having a shell and a solid metal weight disposed within the shell; and
   a foramen disposed in the elliptical sinker proximal to the spool;

wherein the elliptical sinker is configured to be selectively held within the cusped half arc and the cusped partial arc;

wherein the elliptical sinker is configured to release from the cusped partial arc by a pull of the finger pull toward the duck decoy body;

wherein the elliptical sinker is configured to release from the cusped partial arc by an upward pivot of the rear platform; and wherein the elliptical sinker is configured to release from the cusped half arc upon a release from the cusped partial arc.

2. A duck decoy device comprising:
a hollow duck decoy body, the duck decoy body having a head end and a tail end spaced apart from the head end, a top side and a bottom side spaced apart from the top side;
a ring disposed in the top side of the tail end;
an elliptical base affixed within the bottom side, the base having an upper side and a lower side spaced apart from the upper side, the base and duck decoy body water tight;
a peripheral lip affixed to the upper side;
a longitudinal rib centrally disposed on the upper side, the longitudinal rib substantially extending from proximal the head end to the tail end;
a plurality of spaced apart lateral ribs disposed on the upper side, the lateral ribs intersecting the longitudinal rib;
a quonset-shaped housing disposed on the upper side, the housing having a first side spaced apart from a second side, an opening disposed through the upper side and the lower side, a beveled entry disposed between the opening and the lower side;
a mirror image laterally protruded indent disposed within each of the first side and the second side;
an insert removably inserted into the base, the insert having a superior side and an inferior side spaced apart from the superior side; the insert having a front platform and a substantially pear-shaped rear platform removably attached to the left platform, the front platform having:
   a left half and a right half selectively separable from the left half, a front side and a rear side spaced apart from the front side, the superior side of each of the left half and the right half having:
      a stilted arch;
      a flexible ear disposed in the stilted arch;
      a detent disposed upwardly within the flexible ear, each detent selectively fitted into a respective one of the indents;
      wherein the detents and indents are configured to selectively retain the insert within the base;
      a quonset-shaped receiver disposed longitudinally adjacent the rear side;
      a slot disposed in the receiver at the rear side;
      a depression disposed within the slot;
      a plurality of spaced apart spacers disposed on the front platform inferior side;
      a half parallelepiped shaft extended longitudinally from the rear side;
an axle extended laterally from the right half stilted arch to the left half stilted arch;
an orifice disposed within the left half stilted arch, the orifice removably receiving the axle;
a self-retracting spool removably disposed on the axle;

a flexible line disposed on the spool;
a disc disposed on the spool proximal the stilted arch on the right half;
a plurality of spaced apart notched teeth disposed along an entire outer perimeter of the disc;
the insert front platform bottom side having an inwardly open cusped half arc disposed on the front side and extended downwardly away from the front platform;
the rear platform having a bottom portion and a neck portion affixed to the bottom portion, the rear platform having:
  a centrally disposed parallelepiped shaft;
  an upwardly directed hook forwardly disposed on the centrally disposed parallelepiped shaft,
    the hook having a proximal portion integrally disposed on the shaft at an angle of approximately 225 degrees relative the shaft and a distal portion disposed at an angle of approximately 235 degrees relative the proximal portion, wherein the hook is engageable to one of the notched teeth, wherein engagement of the hook to one of the notched teeth arrests a spinning movement of the spool;
  a pair of spaced apart arms extended toward the front platform;
  a projection disposed medially on each arm of the pair of arms, one of each projection removably and pivotally fitted within one of the depressions, respectively;
a finger pull disposed on the neck portion inferior side;
a cusped half arc disposed on the front platform front side and extended downwardly therefrom;
a cusped partial arc disposed on the rear platform rear side and extended downwardly therefrom;
an elliptical sinker having a shell and a solid metal weight disposed within the shell; and
a foramen disposed in the elliptical sinker proximal to the self-retracting spool, wherein the foramen is configured to provide for selectively securing the line from the spool to the sinker;
wherein the elliptical sinker is configured to be selectively held within the cusped half arc and the cusped partial arc;
wherein the elliptical sinker is configured to release from the cusped partial arc by a pull of the finger pull toward the duck decoy body;
wherein the elliptical sinker is configured to release from the cusped partial arc by an upward pivot of the rear platform; and
wherein the elliptical sinker is configured to release from the cusped half arc upon a release from the cusped partial arc.

3. The duck decoy device of claim 2 wherein the self-retracting spool is further a ratcheting spool.

* * * * *